United States Patent
Barke et al.

(10) Patent No.: US 12,553,372 B2
(45) Date of Patent: Feb. 17, 2026

(54) AFTERTREATMENT SYSTEM FOR LOCOMOTIVE

(71) Applicant: Caterpillar Inc., Peoria, IL (US)

(72) Inventors: Lance Clay Barke, Peoria, IL (US); Qiang Zhu, Wuxi (CN); Douglas Tuenge Scott, Rapid City, SD (US); Andrew M. Denis, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 2 days.

(21) Appl. No.: 18/791,768

(22) Filed: Aug. 1, 2024

(65) Prior Publication Data

US 2026/0036071 A1    Feb. 5, 2026

(51) Int. Cl.
*F01N 3/28* (2006.01)
*B61C 5/04* (2006.01)

(52) U.S. Cl.
CPC .............. *F01N 3/2892* (2013.01); *B61C 5/04* (2013.01); *F01N 3/2839* (2013.01)

(58) Field of Classification Search
CPC .. F01N 3/2892; F01N 3/2839; F01N 2590/08; B61C 5/04
USPC ........................................................ 60/299
See application file for complete search history.

(56) References Cited

U.S. PATENT DOCUMENTS

| | | | |
|---|---|---|---|
| 7,412,824 B1 | 8/2008 | Newburry et al. | |
| 8,752,370 B2 * | 6/2014 | Hittle | F01N 3/2066 60/296 |
| 9,359,930 B2 * | 6/2016 | Music | F01N 13/1822 |
| 2012/0096833 A1 | 4/2012 | Tan et al. | |
| 2012/0216704 A1 * | 8/2012 | Smith, Jr. | B61C 7/04 105/35 |
| 2013/0125524 A1 * | 5/2013 | Plummer | F01N 13/002 60/39.5 |
| 2016/0348558 A1 * | 12/2016 | Garduno | F01N 3/2066 |

(Continued)

FOREIGN PATENT DOCUMENTS

| | | | | |
|---|---|---|---|---|
| CN | 218030334 U | * | 12/2022 | |
| EP | 1886892 A1 | * | 2/2008 | B61C 5/04 |

OTHER PUBLICATIONS

Written Opinion and International Search Report for Int'l. Patent Appln. No. PCT/US2025/038442, mailed Oct. 8, 2025 (24 pgs).

*Primary Examiner* — Mark A Laurenzi
*Assistant Examiner* — Kelsey L Stanek
(74) *Attorney, Agent, or Firm* — Schwegman Lundberg & Woessner, P.A.

(57) ABSTRACT

Apparatus, systems and methods including an apparatus for aftertreatment of exhaust flow from a diesel engine of a locomotive are shown and described. The apparatus can include: a housing having an elongate length and a height that is relatively smaller than the elongate length; a mixing tube configured to receive the exhaust flow of the diesel engine, wherein the mixing tube is positioned within the housing and extends longitudinally along at least a portion of the elongate length of the housing; a first plurality of treatment units in fluid communication with the exhaust flow from the mixing tube, wherein catalysts of the first plurality of treatment units are configured to treat the exhaust flow; and a door forming part of a roof of the locomotive, wherein the door is openable to provide access to at least some of the first plurality of treatment units.

20 Claims, 16 Drawing Sheets

(56) References Cited

U.S. PATENT DOCUMENTS

2022/0065143 A1* 3/2022 Shetti .................. B01D 46/003
2024/0392719 A1* 11/2024 Muter ................ B01D 53/9477

* cited by examiner

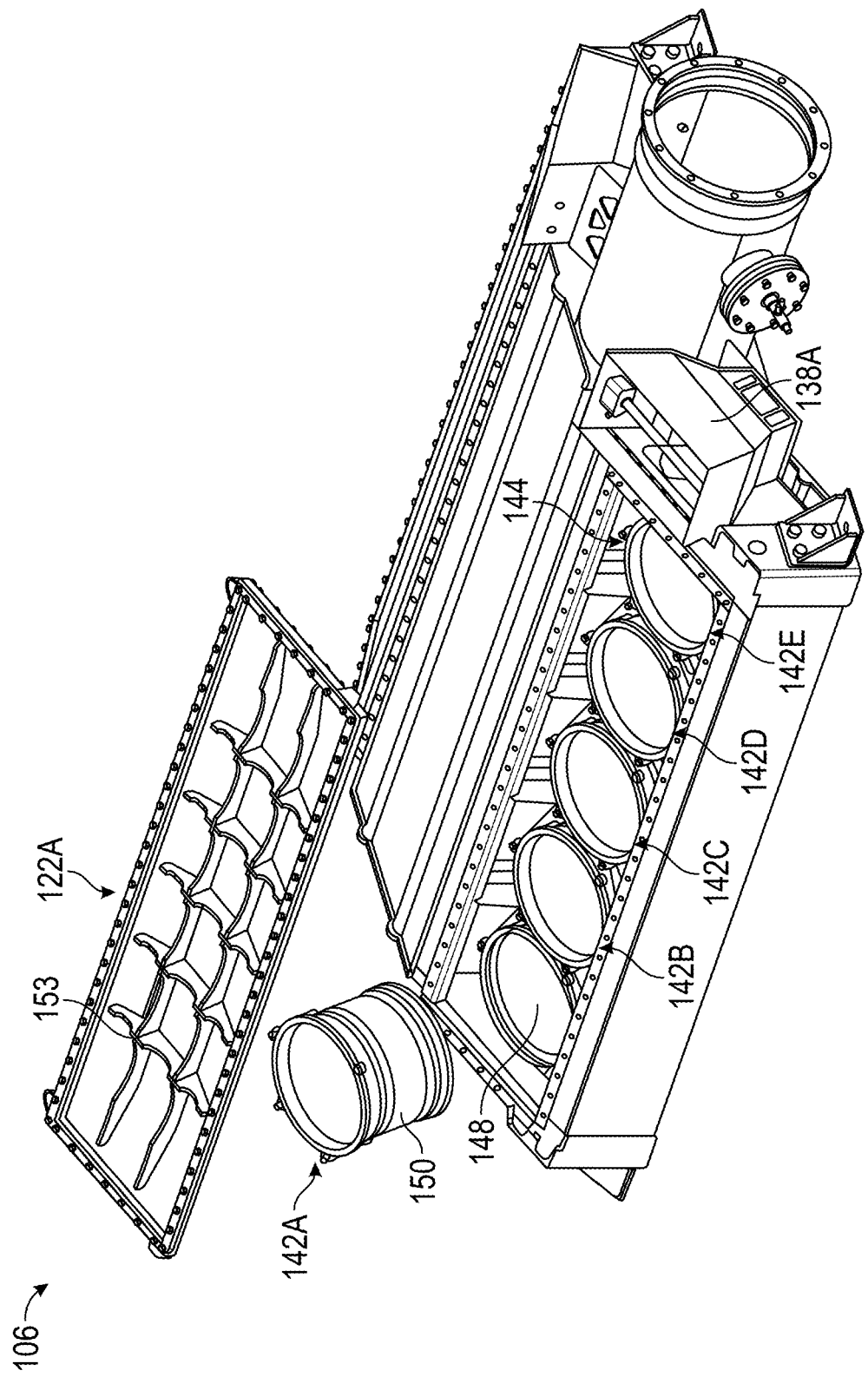

AFTERTREATMENT SYSTEM FOR LOCOMOTIVE

TECHNICAL FIELD

The present application relates generally to exhaust treatment systems for a diesel engine of a locomotive. More particularly, the present application relates to aftertreatment apparatuses and methods that provide for service of catalysts through a roof of the locomotive.

BACKGROUND

Locomotives are often powered by diesel engines for propulsion and often use the diesel engine to provide electric power to passenger cars of the train.

Emission control regulations continue to evolve and become more stringent as environmental concerns over combustion engine emissions continue to increase. Emissions standards are regulatory requirements that set specific limits that relate to particle numbers and/or nitrogen gas emissions. Emission standards vary throughout the world and vary by mode of transport.

Initiated by the U.S. Environmental Protection Agency (EPA), the Tier emissions standards began in the mid-1990s. These standards specifically target the reduction of exhaust emissions from diesel engines. The standards have become progressively stricter; Tier 4 Final, the latest phase, requires significant reductions in particulate matter (PM) and nitrogen oxides (NOx). Similar to the U.S. Tier standards, the European Union has implemented Euro standards that stipulate allowable limits of exhaust emissions for new vehicles sold in EU member states. These standards also focus on reducing NOx, PM, carbon monoxide (CO), and hydrocarbons (HC).

To meet such standards, clean emissions modules (CEM) have been developed. CEM apparatuses are advanced systems integrated into diesel engines to treat exhaust emissions and ensure compliance with emissions standards. These systems typically utilize a combination of technologies to reduce emissions.

Various CEM apparatuses have been developed including for locomotives. Examples are described in U.S. Pat. Nos. 9,359,930 and 8,752,370. However, these patents do not provide for servicing the catalysts in the manner discussed herein and are constructed in a different manner than the apparatus of the present application.

SUMMARY

In one or more embodiments, an apparatus for aftertreatment of exhaust flow from a diesel engine of a locomotive, optionally including: a housing having an elongate length and a height that is relatively smaller than the elongate length; a mixing tube configured to receive the exhaust flow of the diesel engine, wherein the mixing tube is positioned within the housing and extends longitudinally along at least a portion of the elongate length of the housing; a first plurality of treatment units in fluid communication with the exhaust flow from the mixing tube, wherein catalysts of the first plurality of treatment units are configured to treat the exhaust flow; and a door forming part of a roof of the locomotive, wherein the door is openable to provide access to at least some of the first plurality of treatment units.

In one embodiment, a method for servicing an apparatus for aftertreatment of exhaust flow from a diesel engine of a locomotive, the method optionally including: opening one or more of a plurality of doors that form part of a roof of the locomotive to expose a plurality of treatment units each containing a catalyst configured to treat the exhaust flow; removing one or more catalysts from the plurality of treatment units; inserting a new catalyst in respective of the plurality of treatment units from which the removing the one or more catalysts occurred; and reassembling the one or more of the plurality of doors back on the apparatus to enclose the plurality of treatment units.

In another embodiment, a locomotive optionally including: a diesel engine; exhaust ducting coupled to the diesel engine and configured to configured to receive an exhaust flow from the diesel engine; and an apparatus for aftertreatment of the exhaust flow from the diesel engine, wherein the apparatus forms part of a roof of the locomotive, the apparatus including: a mixing tube configured to receive the exhaust flow from the exhaust ducting; a first plurality of treatment units in fluid communication with the exhaust flow from the mixing tube, wherein catalysts of the first plurality of treatment units are configured to treat the exhaust flow; and a door forming part of the roof of the locomotive, wherein the door is removeable from the apparatus to provide access to at least some of the first plurality of treatment units for removal and replacement. [complete section upon approval of claims.

DESCRIPTION OF THE DRAWINGS

FIG. 5 is a perspective view of the apparatus of FIGS. 2A-4A with one of the doors removed and one of the plurality of treatment units removed, according to one or more examples.

DETAILED DESCRIPTION

Figure 1:
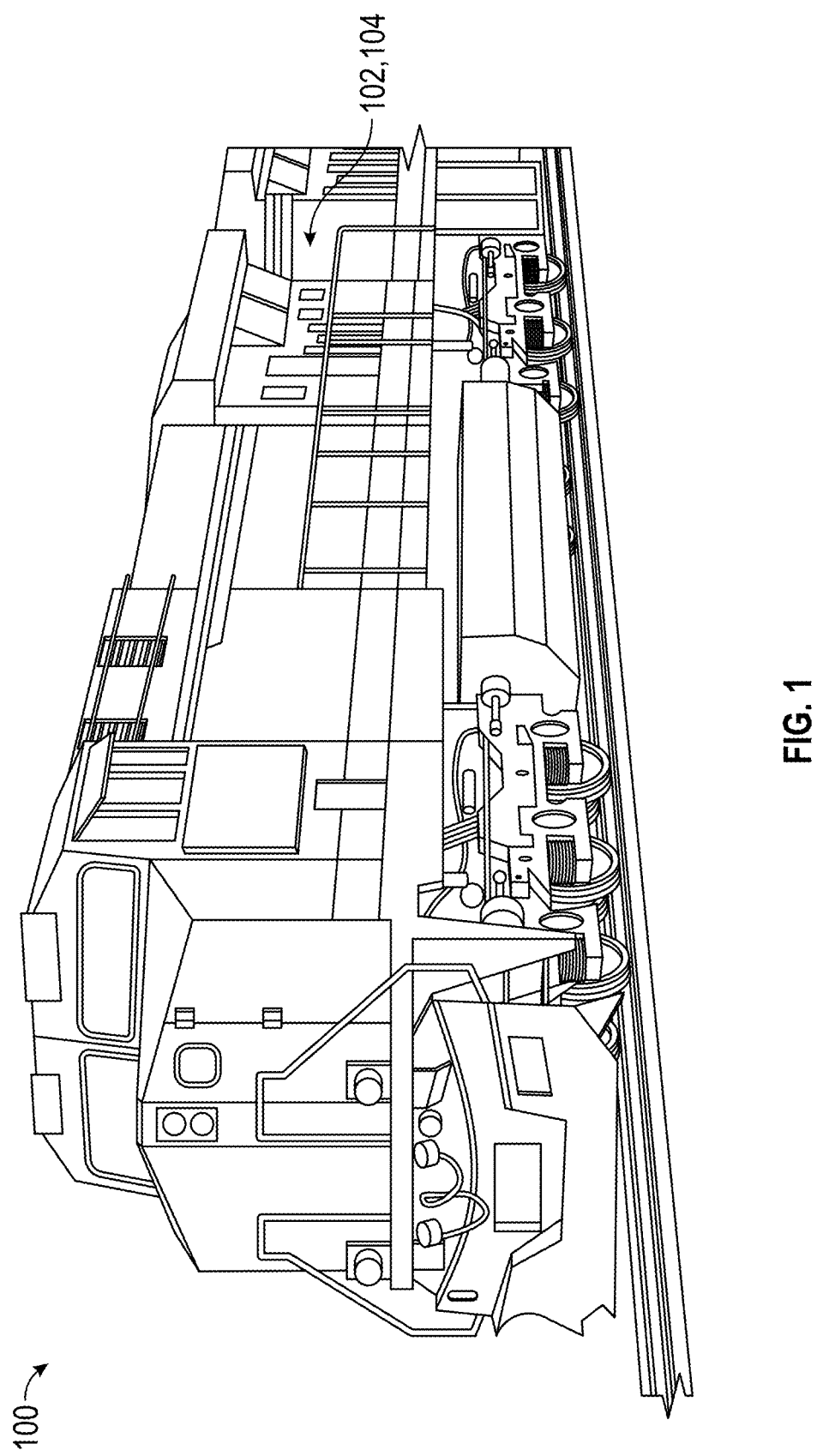
FIG. 1 is a perspective view of a locomotive having a diesel engine and an aftertreatment system for exhaust flow from the diesel engine, according to one or more examples.

FIG. 1 is a perspective view of a locomotive 100. The locomotive 100 may be used for transportation of people and/or materials. In one or more examples, the locomotive 100 may be powered by one or more diesel engines 102, which may be adapted to provide propulsion and/or propulsion in combination with electrical generation. The diesel engine 102 can include features not shown, such as fuel systems, air systems, cooling systems, peripheries, drivetrain components, turbochargers, etc. The engine need not be diesel in some examples but may be any type of engine (internal combustion, turbine, gas, gaseous fuel, natural gas, propane, etc.), may be of any size, with any number of cylinders, and in any configuration ("V," in-line, radial, etc.). The diesel engine 102 may be used to power any machine or other device, including locomotive applications, on-highway trucks or vehicles, off-highway trucks or machines, earth moving equipment, generators, aerospace applications, marine applications, pumps, stationary equipment, or other engine powered applications.

As shown, the diesel engine 102 may include an aftertreatment system 104 configured for treating the exhaust flow of the diesel engine 102 prior to releasing the exhaust flow into the atmosphere. While the present application has been drafted in the context of locomotive power, the aftertreatment system 104 described herein may be applicable for providing aftertreatment to any diesel-powered work machine, stationary power generation engine or other diesel-powered equipment, automobile, or machine.

The aftertreatment system 104 may be configured to reduce emissions from the diesel engine 102. In particular, the aftertreatment system 104 may be configured to control particle emissions, nitrogen gas emissions and/or other emissions from the diesel engine 102. As shown, the aftertreatment system 104 may include various apparatuses for controlling emissions including an apparatus as shown in FIGS. 2A-2D. The apparatuses discussed herein can be configured for, but are not limited to, diesel particulate filtering (DPF), selective catalytic reduction (SCR) and/or diesel oxidation catalyst (DOC). The systems and methods contained herein are applicable to varying particulate and/or emission of the DPF, the SCR, the DOC and/or other components. Put another way, the principles and techniques discussed herein can be applied to any of DPF, SCR, DOC or other applicable emissions reduction technology.

DPF can be configured to filter out diesel particulate in an exhaust flow from the diesel engine 102. For example, the DPF may be configured to filter out soot and ash from the exhaust stream. Moreover, the DPF may be configured for ongoing (e.g., passive) regeneration.

Apparatuses for DPF, SCR and DOC may include one or more treatment units. In the case of DPF, these can be filter media arranged within one or more of the fluid pathways. The exhaust flow from the diesel engine passes through the one or more of treatment units before exiting the DPF. Various constructs for the one or more treatment units are known. The one or more of treatment units may have a porosity selected to allow exhaust gas through the filter media while reducing or preventing passage of ash and soot.

DPF may also be configured for ongoing (e.g., passive) regeneration. For example, the DOC may be provided upstream of the DPF. The DOC can function to produce nitrogen dioxide ($NO_2$). For example, the DOC may include an oxidation catalyst that functions to absorb oxygen from the exhaust gas providing an opportunity for other elements in the exhaust gas to react with the bonded oxygen. In particular, nitric oxide (NO) may react with the oxygen to form nitrogen dioxide ($NO_2$). When the nitrogen dioxide passes through the one or more treatment units in the DPF, the nitrogen dioxide may react with the carbon in the soot to form carbon dioxide ($CO_2$), which may then pass through the one or more treatment units such as filter media. Alternatively or additionally, the DPF may include a catalyst as the one or more treatment units or the one or more treatment units can include a combination of a catalyst and the filter media. The catalyst can function to generate $NO_2$. The $NO_2$ generated in the filter media may back diffuse through the filter media and react with the soot to form $CO_2$, which may pass through the filter media and out of the DPF. In either case, some of the $NO_2$ generated either in the DOC or within the filter media of the DPF may not be fully absorbed or utilized in the regeneration process and, as such, the nitrogen oxide gases ($NO_x$) leaving the DPF may be a combination of NO and $NO_2$.

SCR system can be arranged downstream of the DPF. The SCR may be configured to reduce the amount of nitrogen oxide gas ($NO_x$) in the exhaust before it is released into the atmosphere. In particular, the SCR may function to react ammonia ($NH_3$) with $NO_x$ in the exhaust gas to produce nitrogen and water and, as such, reduce the emission of $NO_x$. The SCR may include a housing defining an internal cavity and having an inlet and an outlet. The SCR may have a diesel exhaust fluid (DEF) reservoir in fluid communication with the cavity via a controllable valve or nozzle. In one or more examples, the DEF may be in fluid communication with the exhaust stream upstream of the SCR and not directly in the cavity. The SCR may also have one or more of treatment units such as a series of catalysts arranged within the cavity. For example, the SCR may include a hydrolysis catalyst adapted to convert liquid urea to ammonia, for example. The SCR may also include an SCR catalyst to convert the ammonia and $NO_x$ to nitrogen and water. The SCR catalysts may include various porous ceramic materials with active catalytic components arranged on the ceramic material. For example, the SCR catalyst may include oxides of base metals such as vanadium, molybdenum, and tungsten, zeolites, or various precious metals may be used. Still other active catalytic components may be used. In one or more examples, the SCR may also include an oxidation catalyst or an ammonia slip catalyst to address any remaining ammonia in the exhaust gas.

Although not discussed herein, the apparatuses disclosed herein may also include one or more sensors such as at the inlet and/or outlet thereof, respectively. The sensors may be absolute pressure sensors, particulate sensors, emission sensors, combinations thereof, or the like. As an example, the sensors can be configured for sensing respective pressures at the inlet/outlet such that a differential pressure or pressure drop across the apparatus may be calculated or determined.

Figure 2A:
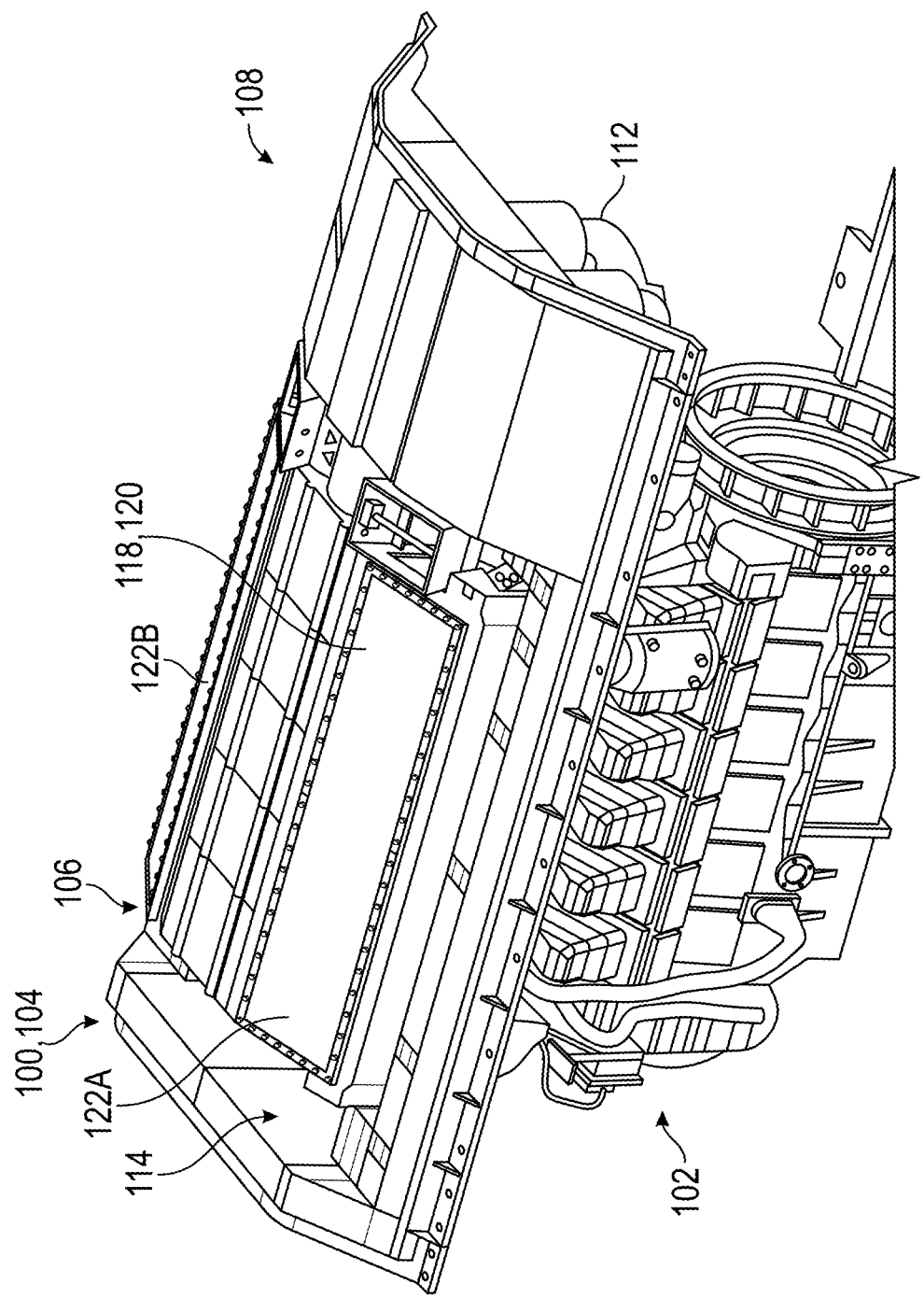
FIG. 2A is a first perspective view of the diesel engine and a portion of a roof of the locomotive including an apparatus for aftertreatment of the exhaust flow from the diesel engine, according to one or more examples.
Figure 2B:
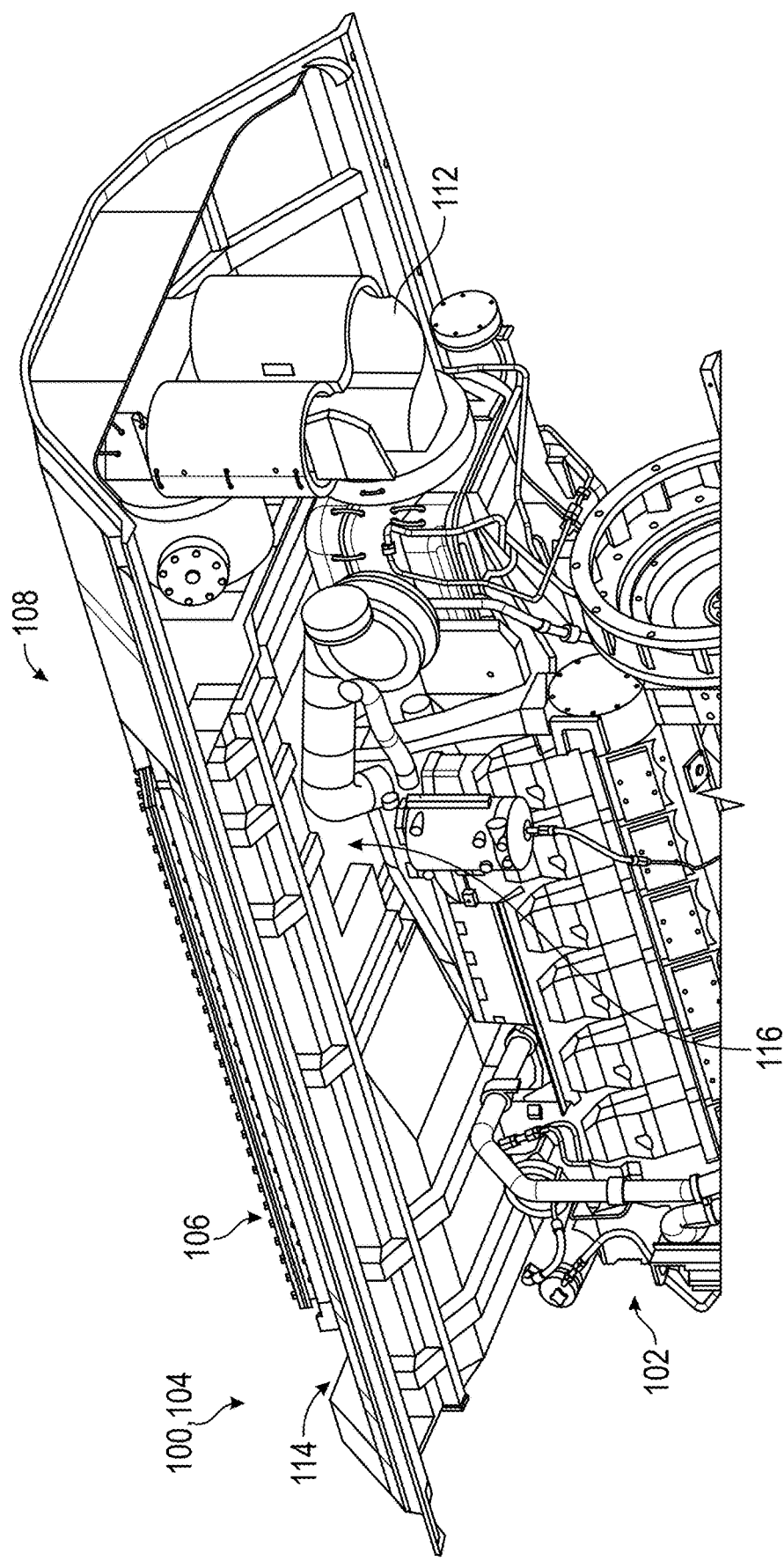
FIG. 2B is a second perspective view of the diesel engine and the portion of the roof of the locomotive including the apparatus of FIG. 2A.
Figure 2C:
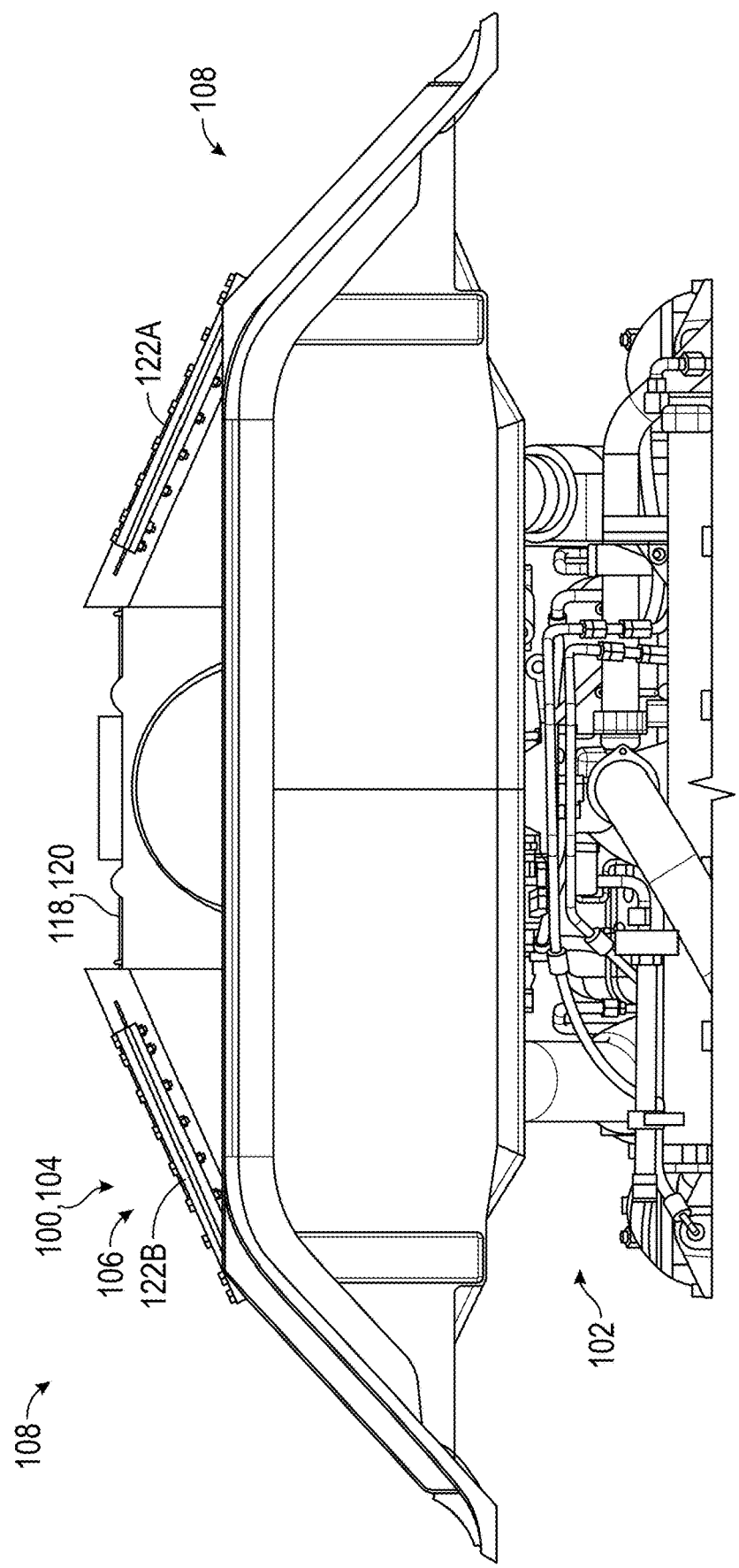
FIG. 2C is a first plan view of a first side of the diesel engine and the portion of the roof of the locomotive including the apparatus of FIGS. 2A and 2B.
Figure 2D:
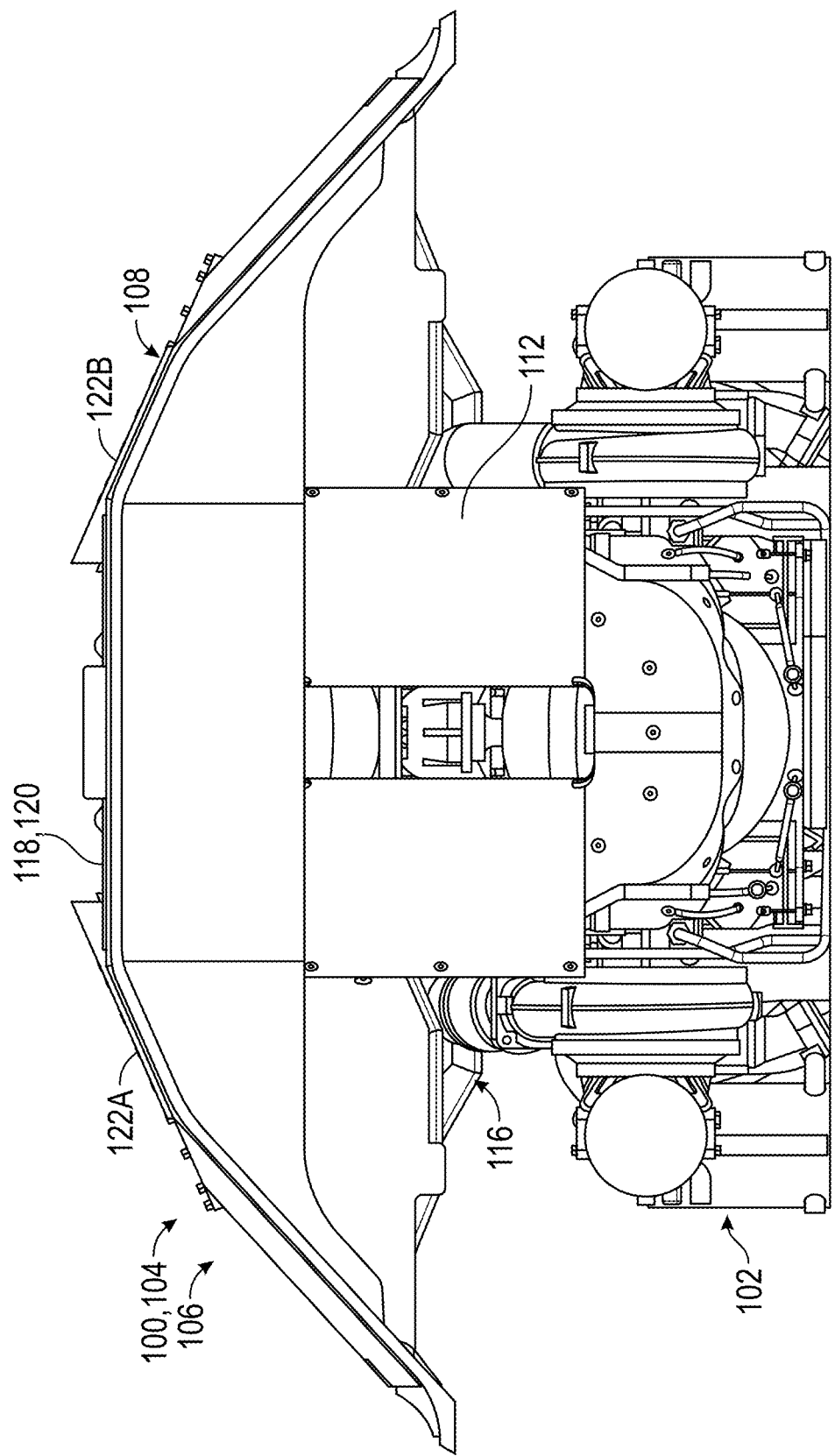
FIG. 2D is a second plan view of a second opposing side of the diesel engine and the portion of the roof of the locomotive including the apparatus of FIGS. 2A-2C.

FIGS. 2A-2D show an apparatus 106 of the exhaust system 104 coupled to the diesel engine 102. The apparatus 106 can form a portion of a roof 108 of the locomotive 100. The exhaust system 104 can additionally include exhaust ducting 112 as shown in FIGS. 2A, 2B and 2D that allows an exhaust flow from the diesel engine 102 to be conducted to the apparatus 106. Thus, the exhaust ducting 112 is in fluid communication with the diesel engine 102 and the apparatus 106.

The roof 108 can include a recess 114 as shown in FIGS. 2A and 2B. This recess 114, commonly termed a "bathtub" can be located directly above the diesel engine 102, for example. The apparatus 106 can be configured to be received in the recess 114 and is positioned above the diesel engine 102.

As best shown in FIGS. 2B and 2D, the apparatus 106 includes a recess 116 therein configured to accommodate a height profile of the diesel engine 102. Put another way, the recess 116 allows one or more portions of the diesel engine 102 that would otherwise interfere with or project into the apparatus 106 to be positioned below and be spaced from the apparatus 106.

As shown in FIGS. 2A, 2C and 2D, the apparatus 106 includes an outer housing 118 that forms an exterior of the apparatus 106 including forming a top surface 120 of the apparatus 106. The apparatus 106 additionally includes a first door 122A and a second door 122B. The first door 122A and the second door 122B form parts of the roof 108 of the locomotive 100. The first door 122A and the second door 122B are openable such as by being removeable from the housing 118 and apparatus 106 to provide access to one or more treatment units for accessing, removal and replacement of catalysts or filter media contained therein as further discussed and illustrated subsequently. Thus, the apparatus 106 is configured to be integrated into the locomotive 100 to form the portion of the roof 108 thereof. The apparatus 106 and is configured with the first door 122A and the second door 122B to provide for on-locomotive servicing of the catalysts of the treatment units.

The first door 122A and the second door 122B can be bolted or otherwise coupled to the housing 118. This allows the first door 122A and the second door 122B to be opened such as by being removed. This can be accomplished by removing all the bolts that couple the first door 122A and the second door 122B to the housing 118. As shown in FIGS. 2A, 2C and 2D, the first door 122A and the second door 122B can be angulated relative to the top surface 120. This angulation allows the apparatus 106, and particularly, the first door 122A and second door 122B to simulate a roofline of the roof 108 of the locomotive 100 to conform with a tunnel profile. As shown in FIGS. 2A, 2C and 2D, the top surface 120 is substantially flat and extends between the first door 122A and the second door 122B. However, other examples contemplate the top surface 120 can have other configurations.

Figure 3A:
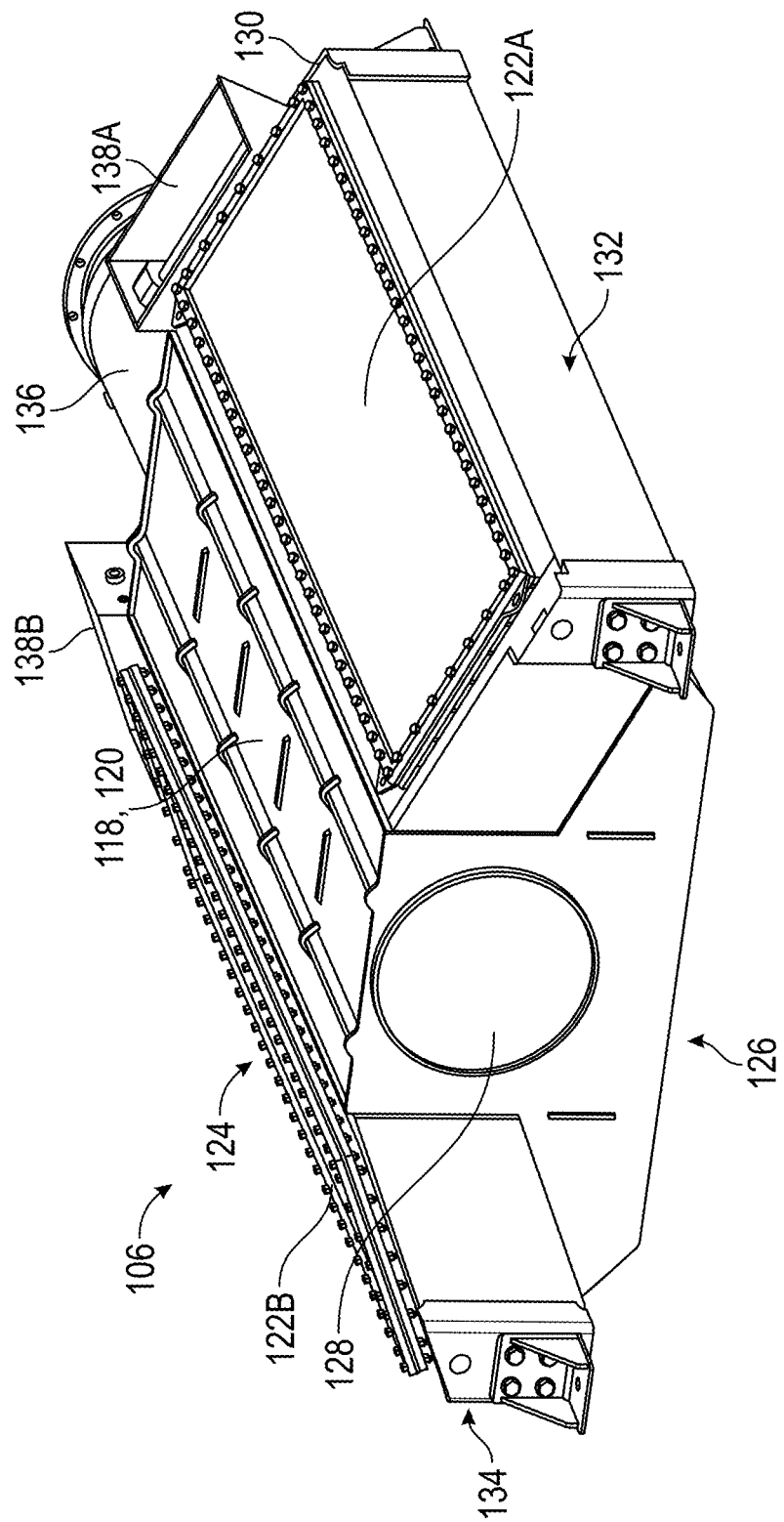
FIGS. 3A-3C are perspective views of the apparatus of FIGS. 2A-2D.
Figure 3B:
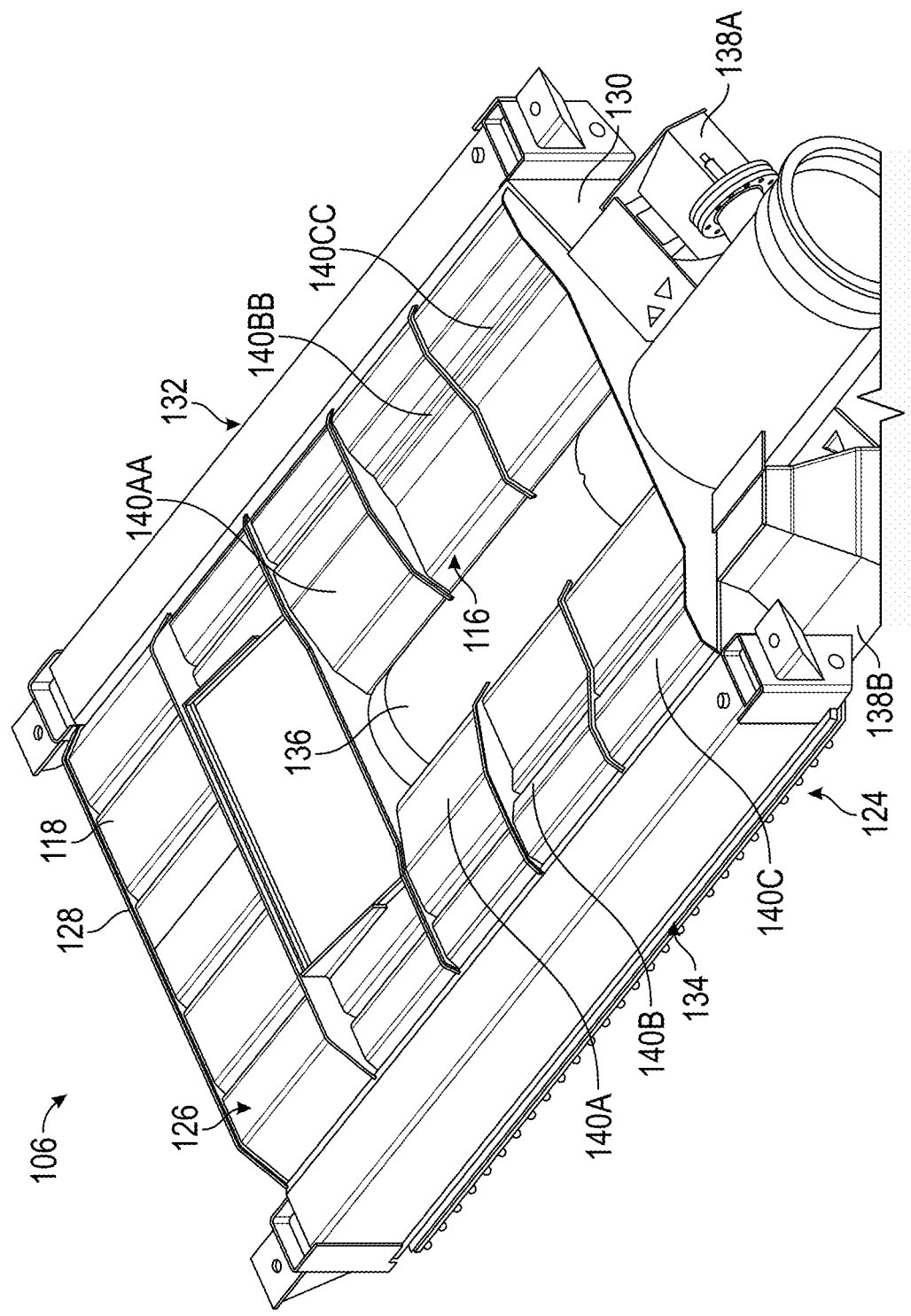
Figure 3C:
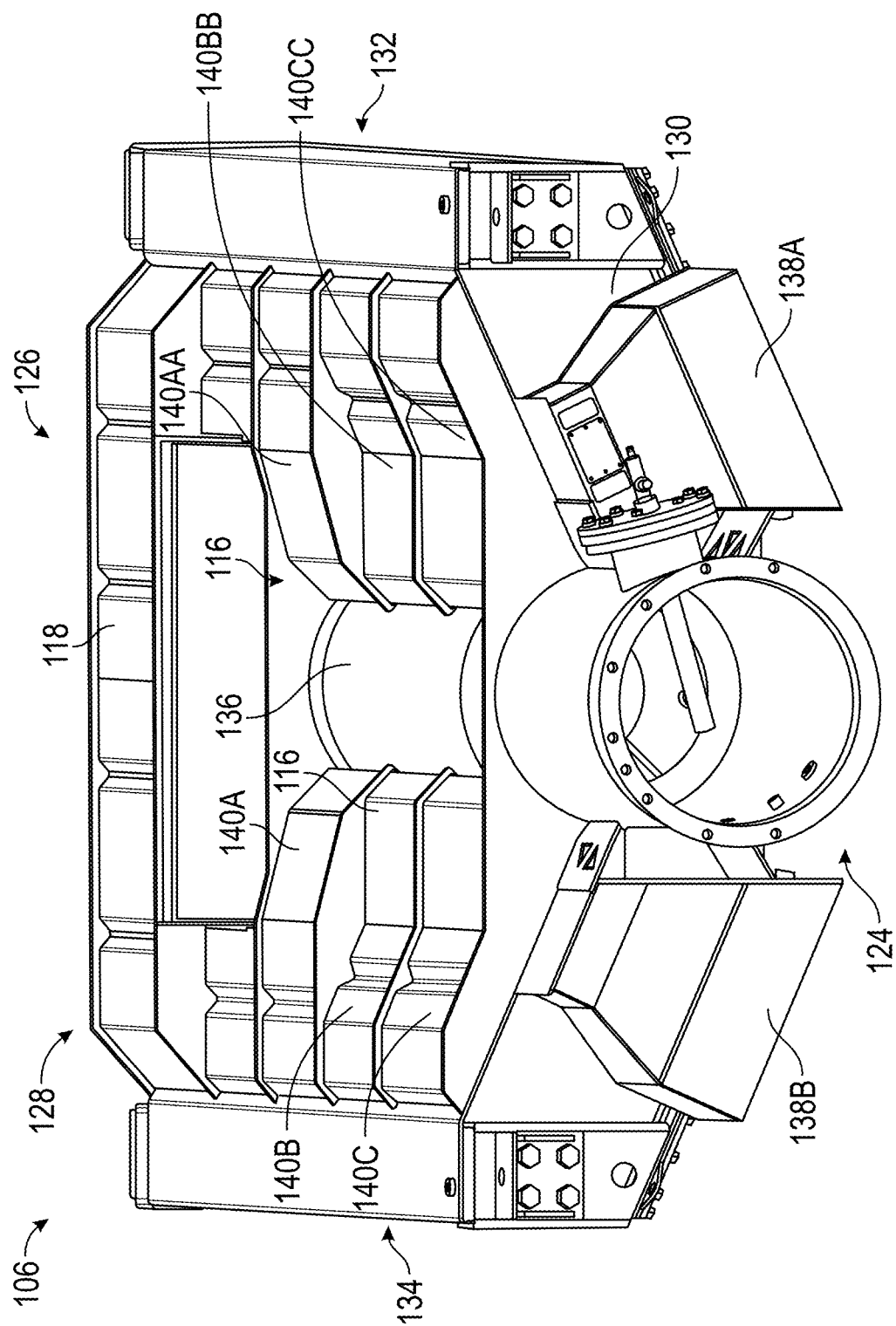

FIGS. 3A-3C show the apparatus 106 in further detail. The apparatus 106 includes the recess 116 (FIGS. 3B and 3C), the housing 118, the top surface 120 (FIG. 3A), the first door 122A (FIG. 3A), the second door 122B (FIG. 3A), a top side 124, a bottom side 126, a first end 128, a second end 130, a first side 132 and a second side 134, a mixing tube 136, a first outlet 138A and a second outlet 138B.

The housing 118 can form an exterior of the apparatus 106 including on the top side 124, the bottom side 126, the first end 128, the second end 130, the first side 132 and the second side 134. The housing 118 along with the first door 122A and the second door 122B form an enclosure for the exhaust flow and house components such as a section of the mixing tube 136, treatment units (not shown) and a multi-path aftertreatment system as further discussed herein.

The housing 118 can have a box like shape being generally rectangular or semi-rectangular in shape and can have elongate length relative to a width and a height. The length can be measured from the first end 128 to the second end 130. The length can be about 3000 mm (maximum), the width can be less than about 1600 mm (maximum) and the height can be less than about 700 mm (maximum). The top side 124 can include the top surface 120, first door 122A (FIG. 3A) and the second door 122B (FIG. 3A). The bottom side 126 can oppose the top side 124 and can include the recess 116. As shown in FIGS. 3B and 3C, a portion of the mixing tube 136 can be exposed along the bottom side 126 within the recess 116. The bottom side 126 can be formed by the housing 118 and can include a number of walls 140A, 140AA, 140B, 140BB, 140C and 140CC that form sloped surfaces of various angulations. These various sloped surfaces can be used to accelerate the exhaust flow from the mixing tube 136 into the treatment units (not shown) as further explained herein.

The first end 128 can form a longitudinal end of the housing 118. The second end 130 can be opposed the first end 128. The first outlet 138A and the second outlet 138B can be positioned adjacent the second end 130. The first outlet 138A and the second outlet 138B can be angled in a manner similar to the first door 122A (FIG. 3A) and the second door 122B (FIG. 3A) so as not to discharge the exhaust flow directly upward. The mixing tube 136 can project from the second end 130 and can extend through the second end 130. The mixing tube 136 can additionally extend internally through the housing 118 to the first end 128 and can be coupled to the housing 118 in that location.

The first side 132 can be positioned adjacent the first door 122A. The second side 134 can be positioned adjacent the second door 122B. The first side 132 can connect with the first end 128, the second end 130, the top side 124 and the bottom side 126. The second side 134 can connect with the first end 128, the second end 130 the top side 124 and the bottom side 126.

The mixing tube 136 can be centrally located within the apparatus 106 and the housing 118. The mixing tube 136 can be located generally between and below the first door 122A (FIG. 3A) and the second door 122B (FIG. 3A). The mixing tube 136 can be position immediately below the top surface 120. As further detailed and illustrated herein, the mixing tube 136 can act as a structural component to structurally support components of the apparatus 106 including the housing 118. Thus, the mixing tube 136 can act as a spine that supports various components of the apparatus 106.

Figure 4:
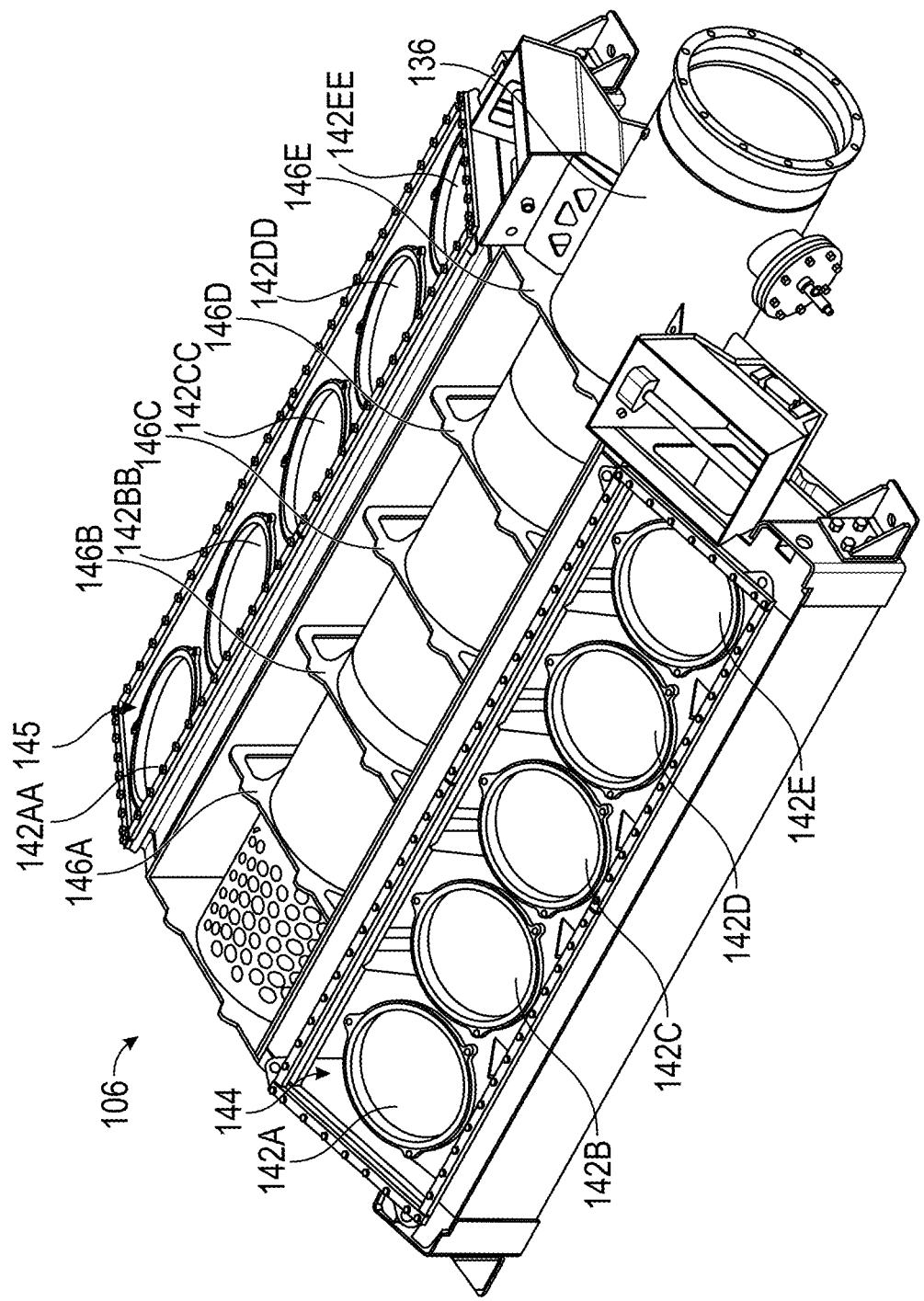
FIG. 4 is a perspective view of the apparatus of FIGS. 2A-3C with a portions of a housing and doors removed to show a multi-path aftertreatment system and a plurality of treatment units, according to one or more examples.
Figure 4A:
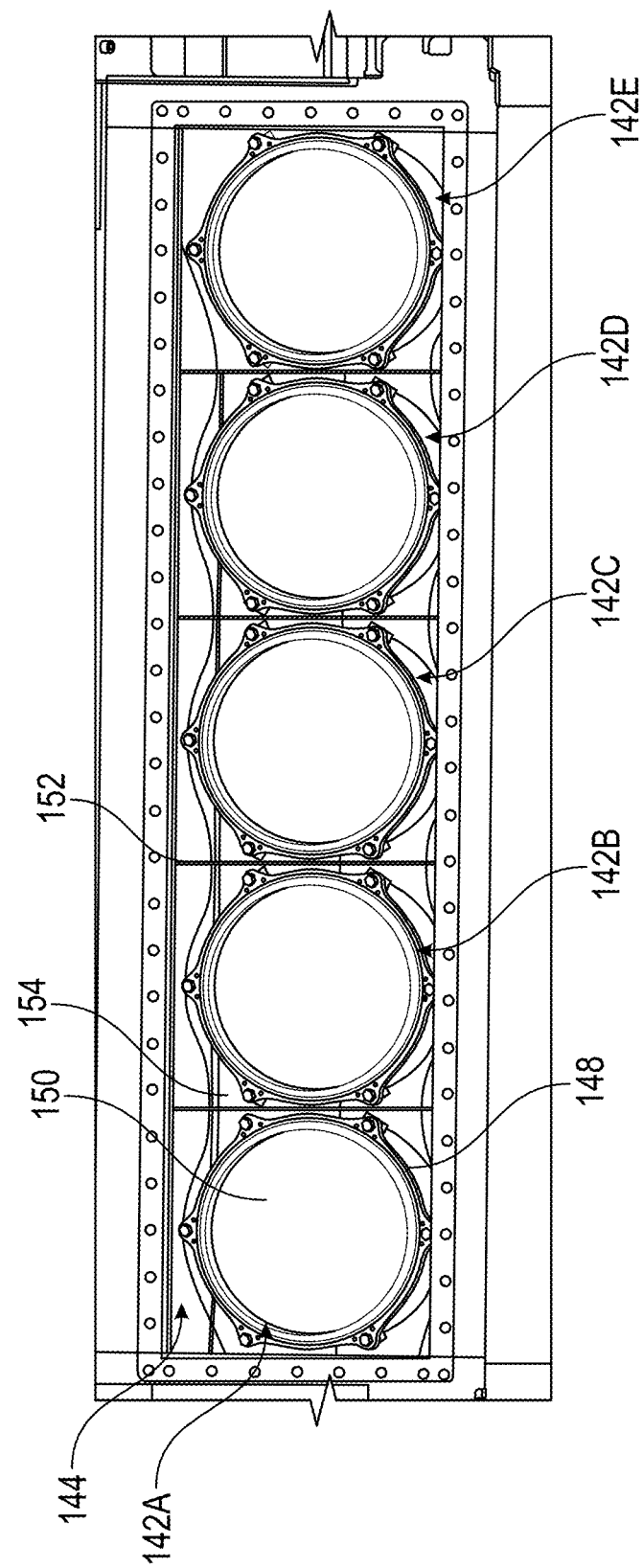
FIG. 4A is an enlarged view of one of the multi-path aftertreatment systems and some of the plurality of treatment units of FIG. 4.

FIG. 4 shows the apparatus 106 with the top surface 120 (FIG. 3A), the first door 122A (FIG. 3A) and the second door 122B (FIG. 3A) removed. As shown in FIG. 4, the apparatus 106 includes a first plurality of treatment units 142A, 142B, 142C, 14par2D and 142E and a first multi-path aftertreatment system 144. FIG. 4A shows an enlarged view of the first plurality of treatment units 142A, 142B, 142C, 142D and 142E and the first multi-path aftertreatment system 144. FIG. 4 additionally shows the mixing tube 136 and a plurality of structural support elements 146A, 146B, 146C and 146D.

The apparatus 106 includes a second plurality of treatment units 142AA, 142BB, 142CC, 142DD and 142EE and a second multi-path aftertreatment system 144 arranged on an opposite side of the mixing tube 136 from the first plurality of treatment units 142A, 142B, 142C, 142D and 142E and the first multi-path aftertreatment system 144. Apparatus 106 is bisymmetrically constructed having the second plurality of treatment units 142AA, 142BB, 142CC, 142DD and 142EE, the second multi-path aftertreatment system 144 and other components on a second side constructed in a similar manner as those shown and described in regards to the first plurality of treatment units 142A, 142B, 142C, 142D and 142E, the first multi-path aftertreatment system 144 and other components on first side as described subsequently herein.

The first plurality of treatment units 142A, 142B, 142C, 142D and 142E are arranged generally longitudinally along the elongate length in a spaced array. The first plurality of treatment units 142A, 142B, 142C, 142D and 142E can be arranged in a parallel flow configuration with the mixing tube 136. Thus, the first plurality of treatment units 142A, 142B, 142C, 142D and 142E can each receive substantially a same amount of the exhaust flow at a substantially uniform flow rate.

The first plurality of treatment units 142A, 142B, 142C, 142D and 142E can be configured to receive a diesel particle filter (filter media) or a catalyst. Thus, the first plurality of treatment units 142A, 142B, 142C, 142D and 142E and the apparatus 106 can be configured for use with a variety of emissions treatment technology, including, but not limited to, regeneration devices, heat sources, oxidation catalysts, DOCs, DPFs, SCRs, lean NOx traps (LNTs), mufflers, or other devices capable of treating the exhaust from a power system. For simplicity, the term catalyst is used but can include filter media and other apparatuses designed to reduce certain emissions.

As shown in FIG. 4A, the first plurality of treatment units 142A, 142B, 142C, 142D and 142E can each include an outer sleeve 148 and a catalyst 150. The outer sleeve 148 can be shaped as a can so as to configured to receive the catalyst 150 therein. The catalyst 150 can be coupled to the outer sleeve 148 (e.g., a tube with openings on either end) by various components such as flanges, bolts, gaskets, etc. The outer sleeve 148 can be configured to support and retain the catalyst 150. The first plurality of treatment units 142A, 142B, 142C, 142D and 142E via the outer sleeve 148 can be supported within the first multi-path aftertreatment system 144 by fins 152 and a flange 154 in addition to being supported by internal walls (shown subsequently) of the housing 118 and portions of the plurality of structural support elements 146A, 146B, 146C and 146D (FIG. 4).

FIG. 5 is a perspective view of the apparatus 106 with the first door 122A removed and the catalyst 150 of the first plurality of treatment units 142A, 142B, 142C, 142D and 142E removed from the sleeve 148. FIG. 5 illustrates what would occur during servicing of the first plurality of treatment units 142A, 142B, 142C, 142D and 142E, as the first door 122A can be opened (e.g., removed, swung open, etc.) to access the first plurality of treatment units 142A, 142B, 142C, 142D and 142E and the catalyst 150 of each of the catalysts 150 can then be removed from the associated outer sleeve 148 and replaced. FIG. 5 additionally illustrates an interior facing side of the first door 122A, which includes baffles 153 to direct the exhaust flow toward the first outlet 138A. FIG. 5 additionally illustrates the first multi-path aftertreatment system 144.

Figure 6:
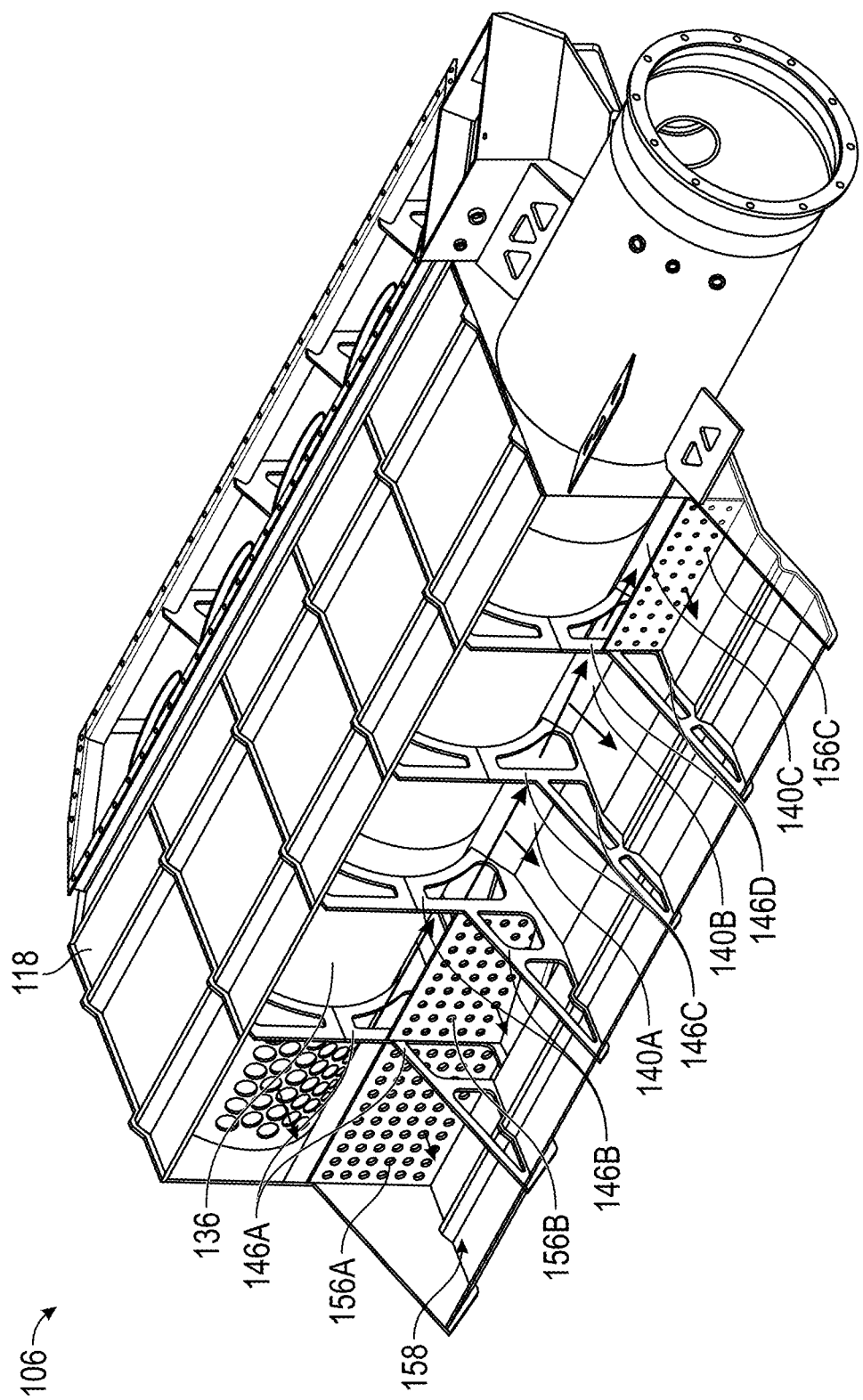
FIG. 6 is a perspective view of the apparatus of FIGS. 2A-5 with various components including portions of the housing and at least some of treatment units removed, according to one or more examples.

FIG. 6 shows the apparatus 106 with some internal walls, the first outlet 138A (FIG. 5), portions of the housing 118 and the first plurality of treatment units 142A, 142B, 142C, 142D and 142E (FIG. 5) removed.

FIG. 6 illustrates the mixing tube 136, a plurality of perforated walls 156A, 156B and 156C, the walls 140A, 140B and 140C, the plurality of structural support elements 146A, 146B, 146C and 146D and a first multi-path pre-treatment system 158. FIG. 6 additionally illustrates with arrows the various possible flow passages (paths) of the exhaust flow.

In FIG. 6, a solid internal wall positioned above and coupled to the plurality of perforated walls 156A, 156B and 156C is removed to better illustrate the plurality of structural support elements 146A, 146B, 146C and 146D and the various possible flow passages. As shown in FIG. 6, the plurality of perforated walls 156A, 156B and 156C can be of different relative sizes and can have perforations of different sizes and frequency to allow for passage of the exhaust flow therethrough at substantially a same rate. The plurality of perforated walls 156A, 156B and 156C can be positioned below and connected to the solid internal wall (not illustrated but shown subsequently). The plurality of perforated walls 156A, 156B and 156C can allow for passage of the exhaust flow therethrough to the first multi-path pre-treatment system 158 as indicated by arrows.

The first multi-path pre-treatment system 158 can be partially defined by portions of the housing 118 including the walls 140A, 140B and 140C, the plurality of perforated walls 156A, 156B and 156C and the first plurality of treatment units 142A, 142B, 142C, 142D and 142E (not shown). The plurality of perforated walls 156A, 156B and 156C can be positioned between the mixing tube 136 and the first multi-path pre-treatment system 158. The first multi-path pre-treatment system 158 has one or more portions such as the walls 140A, 140B and 140C along the flow path of the exhaust flow configured to accelerate the exhaust flow to achieve a substantially uniform flow rate of the exhaust flow into each of the catalysts. The first multi-path pre-treatment system 158 is partially defined by the walls 140A, 140B and 140C, which are each angulated to form a downward sloping ramp extending from adjacent the mixing tube 136 to adjacent one or more of the first plurality of treatment units (not shown). The walls 140A, 140B and 140C can have differing angulations such that each slopes downward in a different manner. The walls 140A, 140B and 140C can each form part of the flow passage for the exhaust flow from the mixing tube 136 into the first multi-path pre-treatment system 158. One or more of the walls 140A, 140B and 140C (e.g., the walls 140A and 140B) can be spaced longitudinally from one or more of the plurality of perforated walls 156A, 156B and 156C (e.g., the walls 156A and 156B). However, in some cases, one or more of the walls 140A, 140B and 140C (e.g., the wall 140C) can be positioned adjacent and utilized with one or more of the plurality of perforated walls 156A, 156B and 156C (e.g., the wall 156C).

As shown in FIG. 6, the plurality of structural support elements 146A, 146B, 146C and 146D can extend into the first multi-path pre-treatment system 158. The plurality of structural support elements 146A, 146B, 146C and 146D have passages to allow for exhaust flow therethrough.

Figure 7:
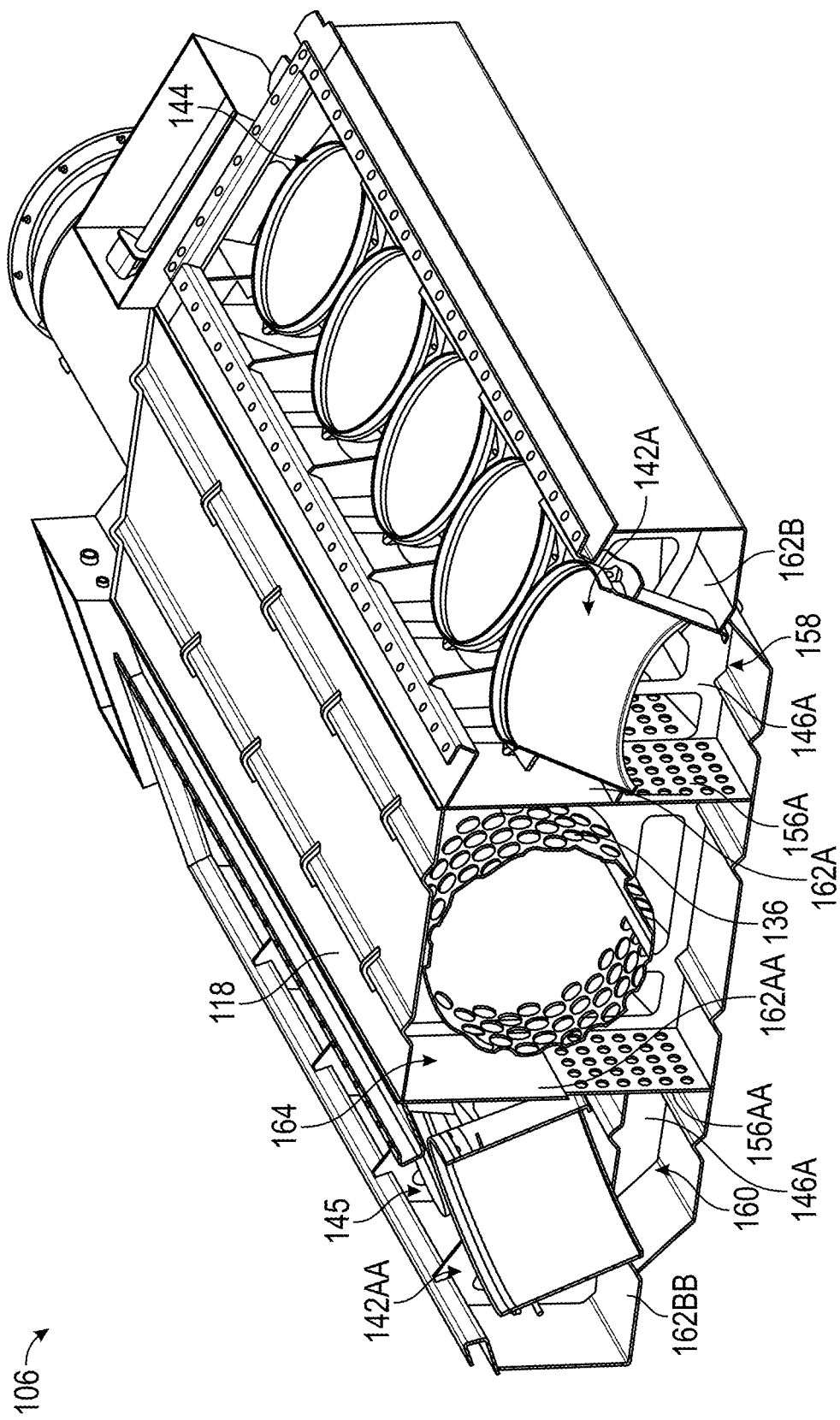
FIG. 7 is a first cross-sectional view of the apparatus of FIGS. 2A-6, according to one or more examples.
Figure 7A:
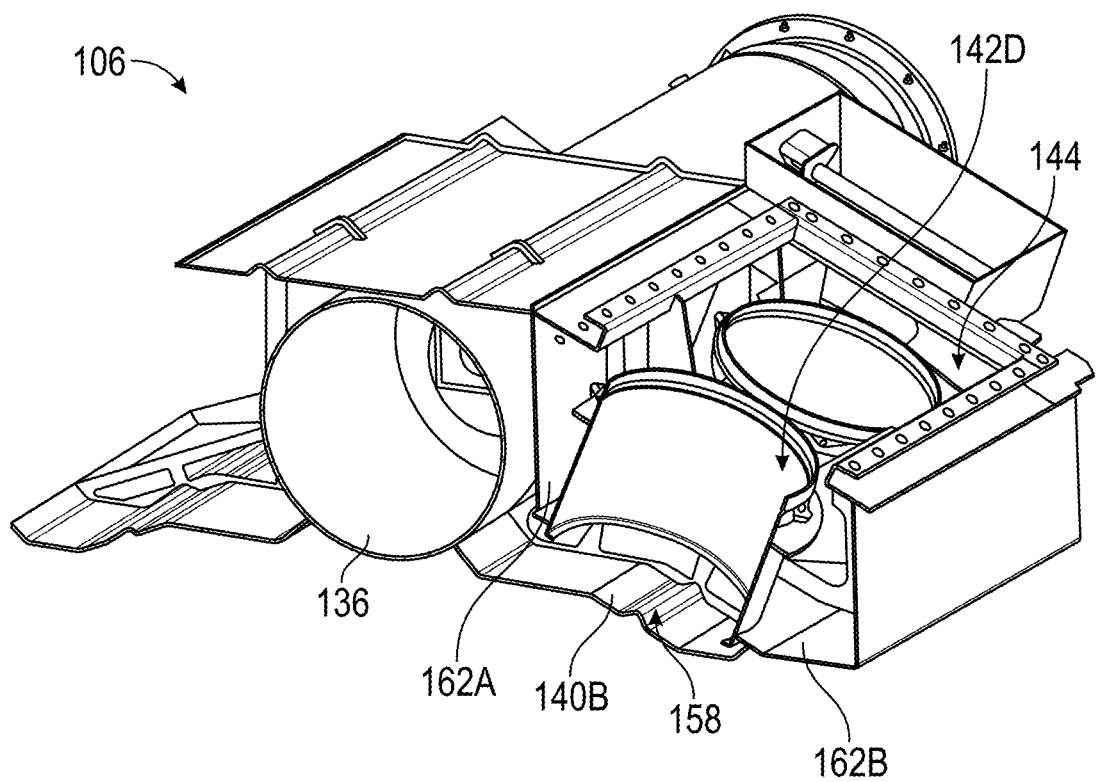
FIG. 7A is a second cross-sectional view of a portion of the apparatus of FIG. 7 with catalyst cans removed from one side thereof.
Figure 7B:
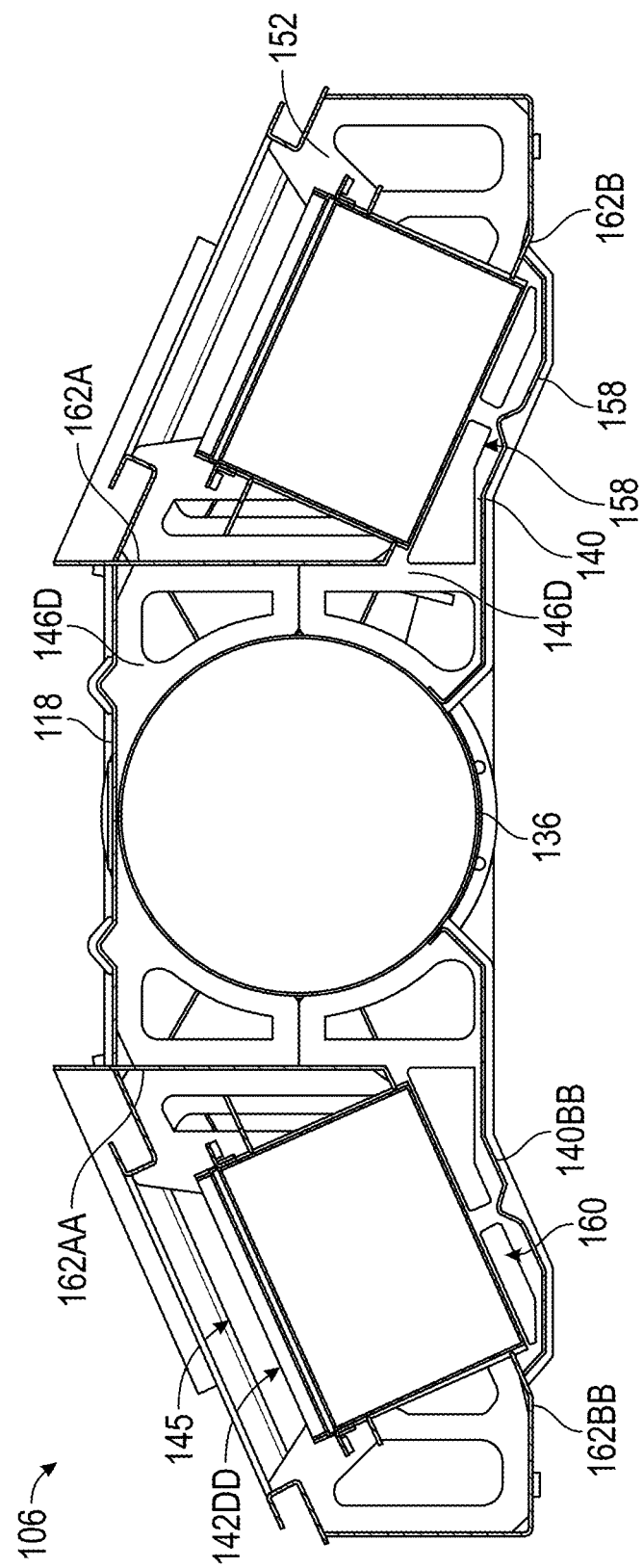
FIG. 7B is a third cross-sectional view of the apparatus of FIG. 7.

FIGS. 7-7B show various cross-sections of the apparatus 106 with the doors removed. FIG. 7 is a cross-sectional view through the apparatus 106 adjacent the first end thereof. The cross-section bisects the treatment units 142A and 142AA, which have the catalyst removed therefrom. The cross-section additionally passes through the first multi-path pre-treatment system 158, a second multi-path pre-treatment system 160, the mixing tube 136, the first multi-path aftertreatment system 144, the second multi-path aftertreatment system 144, the perforated wall 156A, a perforated wall 156AA, first internal walls 162A, 162AA and second internal walls 162B, 162BB.

FIG. 7 shows one of the structural support elements 146A coupled to and extending between the mixing tube 136, portions of the housing 118 and the first internal walls 162A, 162AA and additionally passing through the first internal walls 162A, 162AA to be connected to and support the second internal walls 162B, 162BB within the first multi-path pre-treatment system 158 and the second multi-path pre-treatment system 160.

As shown in FIG. 7, the mixing tube 136 is at least partially surrounded by an enclosure 164 that is formed by portions of the housing 118 and the internal walls 162A and 162AA. The internal walls 162A and 162AA are spaced from the mixing tube 136 and positioned between the mixing tube 136A, the first multi-path aftertreatment system 144 and the second multi-path pre-treatment system 160, respectively. The perforated walls 156A, 156AA can provide one of the many possible flow paths from the enclosure 164. Other possible flow paths for the exhaust flow are show in FIG. 6.

The internal wall 162B surrounds the treatment unit 142A and can be coupled thereto via the outer sleeve 148. The internal wall 162B separates the first multi-path aftertreatment system 144 from the first multi-path pre-treatment system 158. Similarly, the internal wall 162BB surrounds the treatment unit 142AA and can be coupled thereto via the outer sleeve 148. The internal wall 162BB separates the second multi-path aftertreatment system 144 from the second multi-path pre-treatment system 160.

FIG. 7A is a cross-section through a portion of the apparatus 106 at a different location from the cross-section of FIG. 7. The cross-section of FIG. 7A passes through the treatment unit 142D, which has the catalyst removed therefrom. The cross-section of FIG. 7A additionally passes through the first multi-path pre-treatment system 158, the mixing tube 136, the first multi-path aftertreatment system 144, the wall 140B, the first internal wall 162A and the second internal wall 162B. FIG. 7A illustrates the downward sloping ramp formed by the angulated wall 140B extending to adjacent and below the treatment unit 142D. This angulation of the wall 140B changes the shape of the first multi-path pre-treatment system 158 adjacent the treatment unit 142D as compared with the shape of the first multi-path pre-treatment system 158 adjacent the treatment unit 142A in FIG. 7.

FIG. 7B is a cross-section through a similar portion of the apparatus 106 as the location of FIG. 7A but further illustrates a treatment unit 142DD, second multi-path pre-treatment system 160, the second multi-path aftertreatment system 144, the wall 140BB, the first internal wall 162AA and the second internal wall 162BB in addition to the treatment unit 142D, first multi-path pre-treatment system 158, the mixing tube 136, the first multi-path aftertreatment system 144, the wall 140B, the first internal wall 162A and the second internal wall 162B described previously in FIG. 7A.

FIG. 7B shows one of the structural support elements 146D coupled to and extending between the mixing tube 136, portions of the housing 118 and the first internal walls 162A, 162AA and additionally passing through the first internal walls 162A, 162AA to be connected to and support the second internal walls 162B, 162BB within the first multi-path pre-treatment system 158 and the second multi-path pre-treatment system 160. FIG. 7B additionally illustrates some of the fins 152 within the first multi-path aftertreatment system 144 and the second multi-path aftertreatment system 144.

INDUSTRIAL APPLICABILITY

Figure 8:
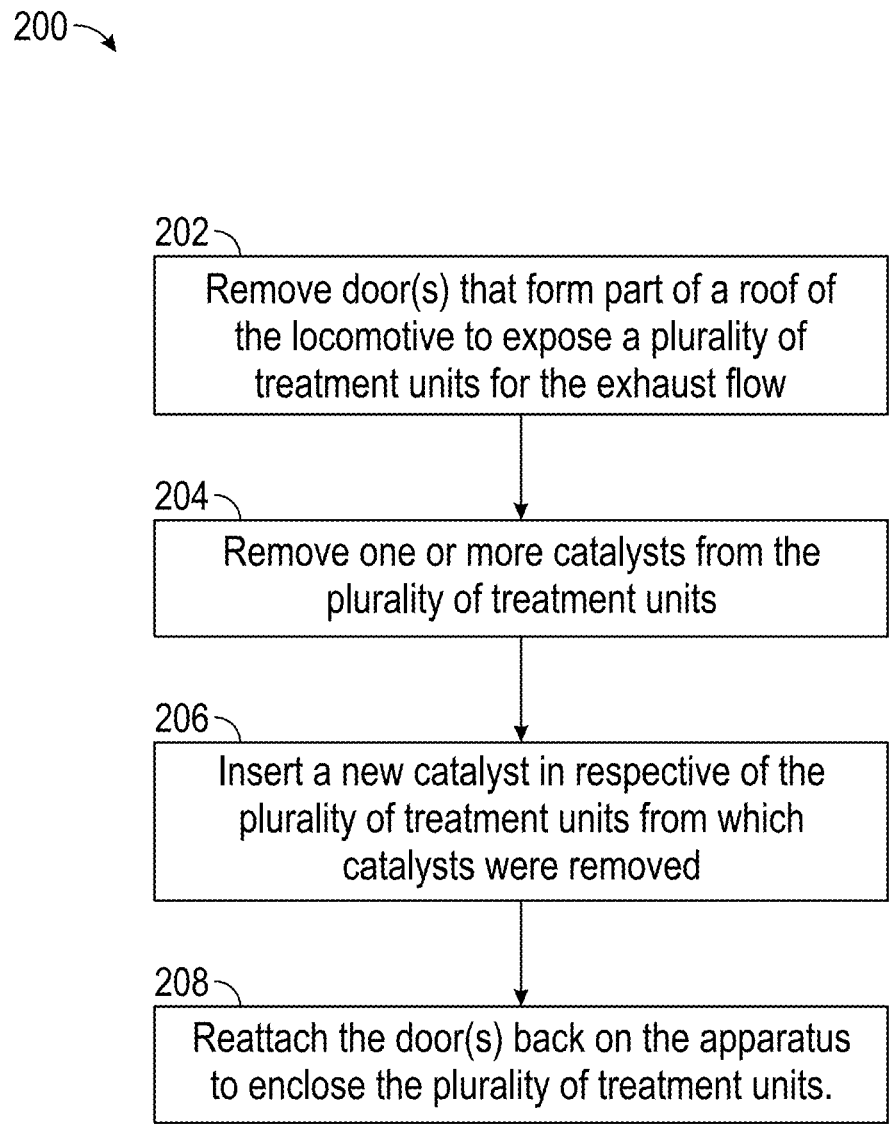
FIG. 8 is a flow diagram of method for servicing an apparatus for aftertreatment of exhaust flow from a diesel engine of a locomotive according to one or more examples.

Various features are disclosed that provide advantages for the apparatus and exhaust system particularly related to serviceability of the catalysts used therein. This includes a method 200 for servicing an apparatus for aftertreatment of exhaust flow from a diesel engine of a locomotive as shown in FIG. 8. The method 200 can include opening 202 one or more of a plurality of doors that form part of a roof of the locomotive to expose a plurality of treatment units each containing a catalyst configured to treat the exhaust flow. The method 200 can include removing 204 one or more catalysts from the plurality of treatment units. The method 200 can include inserting 206 a new catalyst in respective of the plurality of treatment units from which the removing the one or more catalysts occurred. The method 200 can include reassembling 208 the one or more of the plurality of doors back on the apparatus to enclose the plurality of treatment units. Reassembling can simply include fully closing the door to enclose the cavity with the treatment units if a hinge or other mechanical closure feature such as a latch, lock, etc. is utilized. However, reassembling can include reattaching such as by coupling the door to the apparatus with bolts according to some embodiments.

The apparatus 106 and method 200 advantageously allow one or more of the plurality of treatment units to be accessible from the roof of the locomotive by opening of the door(s) 122A or 122B without the need to remove the apparatus 106 from the roof or disassembly various parts of the apparatus to access the plurality of treatment units.

Freight locomotives intended for interchange service are subject to size constraints. For example, the Association of American Railroad (AAR) Plate L diagram defines the clearance envelope for freight locomotives intended for interchange service (see AAR manual of Standards and Recommended Practices-Locomotives and Locomotive Interchange Equipment). Thus, any locomotive exhaust aftertreatment system, originally manufactured or retrofitted, must be positioned and sized to ensure that the locomotive remains within the required clearance envelope.

The apparatus 106 has a relatively small height profile (e.g., less than 700 mm) as compared with the longitudinal length. This construction allows the apparatus 106 to be mounted within the recess 114 as shown in FIG. 2A and to pass through tunnels meeting existing regulatory standards. The apparatus 106 can include the recess 116 (FIGS. 3B and 3C) therein configured to accommodate a height profile of the diesel engine. This allows the apparatus 106 to be utilized with various diesel engine designs without comprising the height profile apparatus along the roof of the locomotive. Additionally, the doors 122A and 122B are angulated relative to a top surface 120 of the housing 118 of the apparatus 106 and relative to other sections of the roof of the locomotive to simulate a roofline of the roof of the locomotive to conform with a tunnel profile.

Referring now to FIGS. 3A-3C, in operation, exhaust flow enters the apparatus 106 via the mixing tube 136 adjacent the second side 134. The exhaust flow passes longitudinally along the mixing tube 136 toward the first side 132. The exhaust flow then exits the mixing tube 136 and turns and passes back toward the second side 134. The exhaust flow additionally splits laterally and passes laterally away from the mixing tube 136 to cavities that form flow pathways adjacent the first side 132 and the second side 134 and located below the first door 122A (FIG. 3A) and the second door 122B (FIG. 3A) before passing through one of the first outlet 138A and the second outlet 138B to leave the apparatus 106. As shown in FIG. 6, the plurality of perforated walls 156A, 156B and 156C can allow for passage of the exhaust flow therethrough to the first multi-path pre-treatment system 158 as indicated by arrows. Additionally, as shown in FIG. 6, the walls 140A, 140B and 140C can each form part of the flow passage for the exhaust flow from adjacent the mixing tube 136 into the first multi-path pretreatment system 158. Turning to FIG. 4, during operation, the first plurality of treatment units 142A, 142B, 142C, 142D and 142E can be arranged in a parallel flow configuration with the mixing tube 136. This arrangement can allow the exhaust flow passes through the catalysts 150 in parallel and allows the exhaust flow to pass from each of the first plurality of treatment units 142A, 142B, 142C, 142D and 142E into the first multi-path aftertreatment system 144. The exhaust flow can contact the first door 122A and can be deflected thereby and travel toward the first outlet 138A.

Thus, the disclosed apparatus provides an efficient, compact, reliable way to reduce undesirable emissions released into the atmosphere. The disclosed apparatus and exhaust treatment system may be used to reduce undesirable exhaust emissions from a power system in a variety of applications, such as but not limited to, from a locomotive.

The above detailed description is intended to be illustrative, and not restrictive. The scope of the disclosure should, therefore, be determined with references to the appended claims, along with the full scope of equivalents to which such claims are entitled.

What is claimed is:

1. An apparatus for aftertreatment of exhaust flow from a engine of a locomotive, comprising:
   a housing having an elongate length and a height that is relatively smaller than the elongate length;
   a mixing tube configured to receive the exhaust flow of the engine, wherein the mixing tube is positioned within the housing and extends longitudinally along at least a portion of the elongate length of the housing;
   a first plurality of treatment units in fluid communication with the exhaust flow from the mixing tube, wherein catalysts of the first plurality of treatment units are configured to treat the exhaust flow;
   a first door forming part of a roof of the locomotive, wherein the first door is openable to provide direct access to at least some of the first plurality of treatment units;
   a first multi-path pre-treatment system located laterally to a first side of the mixing tube and is in fluid communication with the mixing tube to receive the exhaust flow therefrom and pass the exhaust flow to the first plurality of treatment units;
   a first multi-path aftertreatment system in fluid communication with the first plurality of treatment units;
   an outlet in fluid communication with the first multi-path aftertreatment system to receive the exhaust flow and pass the exhaust flow from the apparatus;
   a second plurality of treatment units in fluid communication with the exhaust flow from the mixing tube, wherein catalysts of the second plurality of treatment units are configured to treat the exhaust flow;
   a second door forming a second part of the roof of the locomotive, the second door is openable to provide direct access to the second plurality of treatment units;
   a second multi-path pre-treatment system located laterally to a second side of the mixing tube and is in fluid communication with the mixing tube to receive the exhaust flow therefrom and pass the exhaust flow to the second plurality of treatment units;
   a second multi-path aftertreatment system in fluid communication with the second plurality of treatment units; and
   a second outlet in fluid communication with the second multi-path aftertreatment system to receive the exhaust flow and pass the exhaust flow from the apparatus.

2. The apparatus of claim 1, wherein the first multi-path pre-treatment system has one or more portions along a flow path of the exhaust flow configured to accelerate the exhaust flow to achieve a substantially uniform flow rate of the exhaust flow into each of the catalysts.

3. The apparatus of claim 1, wherein the first multi-path pre-treatment system is partially defined by an angulated wall that forms a downward sloping ramp extending from adjacent the mixing tube to adjacent one or more of the first plurality of treatment units, and wherein the angulated wall forms part of a flow passage for the exhaust flow from the mixing tube to the first multi-path pre-treatment system.

4. The apparatus of claim 3, wherein the first multi-path pre-treatment system is additionally partially defined by a plurality of perforated walls positioned between the mixing tube and at least some of the first plurality of treatment units, wherein the angulated wall is spaced longitudinally from one or more of the plurality of perforated walls.

5. The apparatus of claim 4, wherein the mixing tube is at least partially surrounded by an enclosure that is formed by portions of the housing and an internal wall that is spaced from the mixing tube and positioned between the mixing tube and the first multi-path aftertreatment system.

6. The apparatus of claim 5, further comprising a plurality of structural support elements coupled to and extending between the mixing tube, the portions of the housing and the internal wall, wherein at least some of the plurality of structural support elements extend into the first multi-path pre-treatment system, and wherein the plurality of structural support elements have passages to allow for exhaust flow therethrough.

7. The apparatus of claim 1, wherein the first door and the second door are each angulated relative to a top surface of the housing to simulate a roofline of the roof of the locomotive to conform with a tunnel profile.

8. The apparatus of claim 1, wherein the apparatus is configured to be integrated into the locomotive to form the portion of the roof thereof and is configured with the first door and the second door to provide for on-locomotive servicing of the catalysts of the first plurality of treatment units.

9. An apparatus for aftertreatment of exhaust flow from an engine of a locomotive, comprising:
   a housing having an elongate length and a height that is relatively smaller than the elongate length;
   a mixing tube configured to receive the exhaust flow of the engine, wherein the mixing tube is positioned within the housing and extends longitudinally along at least a portion of the elongate length of the housing;
   a first plurality of treatment units in fluid communication with the exhaust flow from the mixing tube, wherein catalysts of the first plurality of treatment units are configured to treat the exhaust flow; and
   a door forming part of a roof of the locomotive, wherein the door is openable to provide direct access to at least some of the first plurality of treatment units; and
   wherein the apparatus is configured to be received in a recess of the locomotive above the engine and the apparatus includes a recess therein configured to accommodate a height profile of the engine, and wherein the apparatus has a maximum height of less than 700 mm.

10. The apparatus of claim 9, further comprising:
    a first multi-path pre-treatment system located laterally to a first side of the mixing tube and is in fluid communication with the mixing tube to receive the exhaust flow therefrom and pass the exhaust flow to the first plurality of treatment units;
a first multi-path aftertreatment system in fluid communication with the first plurality of treatment units; and
an outlet in fluid communication with the first multi-path aftertreatment system to receive the exhaust flow and pass the exhaust flow from the apparatus.

11. The apparatus of claim 10, wherein the first multi-path pre-treatment system has one or more portions along a flow path of the exhaust flow configured to accelerate the exhaust flow to achieve a substantially uniform flow rate of the exhaust flow into each of the catalysts.

12. The apparatus of claim 10, wherein the first multi-path pre-treatment system is partially defined by an angulated wall that forms a downward sloping ramp extending from adjacent the mixing tube to adjacent one or more of the first plurality of treatment units, and wherein the angulated wall forms part of a flow passage for the exhaust flow from the mixing tube to the first multi-path pre-treatment system.

13. The apparatus of claim 12, wherein the first multi-path pre-treatment system is additionally partially defined by a plurality of perforated walls positioned between the mixing tube and at least some of the first plurality of treatment units, wherein the angulated wall is spaced longitudinally from one or more of the plurality of perforated walls.

14. An apparatus for aftertreatment of exhaust flow from an engine of a locomotive, comprising:
a housing having an elongate length and a height that is relatively smaller than the elongate length;
a mixing tube configured to receive the exhaust flow of the engine, wherein the mixing tube is positioned within the housing and extends longitudinally along at least a portion of the elongate length of the housing;
a first plurality of treatment units in fluid communication with the exhaust flow from the mixing tube, wherein catalysts of the first plurality of treatment units are configured to treat the exhaust flow; and
a door forming part of a roof of the locomotive, wherein the door is openable to provide direct access to at least some of the first plurality of treatment units; and
wherein the door includes a plurality of baffles to direct the exhaust flow toward an outlet of the apparatus.

15. A locomotive comprising:
an engine;
exhaust ducting coupled to the engine and configured to configured to receive an exhaust flow from the engine; and
an apparatus for aftertreatment of the exhaust flow from the engine, wherein the apparatus forms part of a roof of the locomotive, the apparatus comprising:
a mixing tube configured to receive the exhaust flow from the exhaust ducting;
a pair of plenums arranged on opposite sides of the mixing tube, the pair of plenums including a first plenum and a second plenum;
a first plurality of treatment units in the first plenum in fluid communication with the exhaust flow from the mixing tube, wherein catalysts of the first plurality of treatment units are configured to treat the exhaust flow;
a first door forming part of the roof of the locomotive and sealing the first plenum, wherein the first door is removeable from the apparatus to provide access to at least some of the first plurality of treatment units for removal and replacement;
a second plurality of treatment units in the second plenum in fluid communication with the exhaust flow from the mixing tube, wherein catalysts of the second plurality of treatment units are configured to treat the exhaust flow; and
a second door forming part of the roof of the locomotive and sealing the second plenum, wherein the second door is removeable from the apparatus to provide access to at least some of the second plurality of treatment units for removal and replacement.

16. The locomotive of claim 15, further comprising:
a first multi-path pre-treatment system located laterally to a first side of the mixing tube and is in fluid communication with the mixing tube to receive the exhaust flow therefrom and pass the exhaust flow to the first plurality of treatment units;
a first multi-path aftertreatment system in fluid communication with the first plurality of treatment units;
an outlet in fluid communication with the first multi-path aftertreatment system to receive the exhaust flow and pass the exhaust flow from the apparatus;
wherein the first multi-path pre-treatment system is partially defined by an angulated wall that forms a downward sloping ramp extending from adjacent the mixing tube to adjacent one or more of the first plurality of treatment units, and wherein the angulated wall forms part of a flow passage for exhaust flow between the mixing tube and the first multi-path pre-treatment system.

17. The locomotive of claim 16, wherein the mixing tube is at least partially surrounded by an enclosure that is formed by portions of an exterior housing of the apparatus and an internal wall that is spaced from the mixing tube and positioned between the mixing tube and the first multi-path aftertreatment system, and wherein the first multi-path pre-treatment system is additionally partially defined by a plurality of perforated walls positioned between the mixing tube and at least some of the first plurality of treatment units.

18. The locomotive of claim 16, further comprising a plurality of structural support elements coupled to and extending between the mixing tube, one or more portions of an exterior housing of the apparatus and an internal wall of the apparatus, wherein at least some of the plurality of structural support elements extend into the first multi-path pre-treatment system, and wherein the plurality of structural support elements have passages to allow for exhaust flow therethrough.

19. The locomotive of claim 15, wherein the first door and the second door are each angulated relative to an exterior surface formed by a housing of the apparatus to simulate a roofline of the roof of the locomotive to conform with a tunnel profile.

20. The apparatus of claim 15, wherein the apparatus is configured to be received in a recess of the locomotive above the engine and the apparatus includes a recess therein configured to accommodate a height profile of the engine, and wherein the apparatus has a maximum height of less than 700 mm.

* * * * *